March 22, 1966 B. O. WEINSCHEL 3,242,444
SLOW WAVE LINE DOUBLE-STUB TUNER
Filed Jan. 31, 1963 3 Sheets-Sheet 1

INVENTOR
Bruno O. Weinschel

BY *Max L. Libman*

ATTORNEY

March 22, 1966    B. O. WEINSCHEL    3,242,444
SLOW WAVE LINE DOUBLE-STUB TUNER
Filed Jan. 31, 1963    3 Sheets-Sheet 2

INVENTOR
Bruno O. Weinschel

BY   *May L. Libman*

ATTORNEY

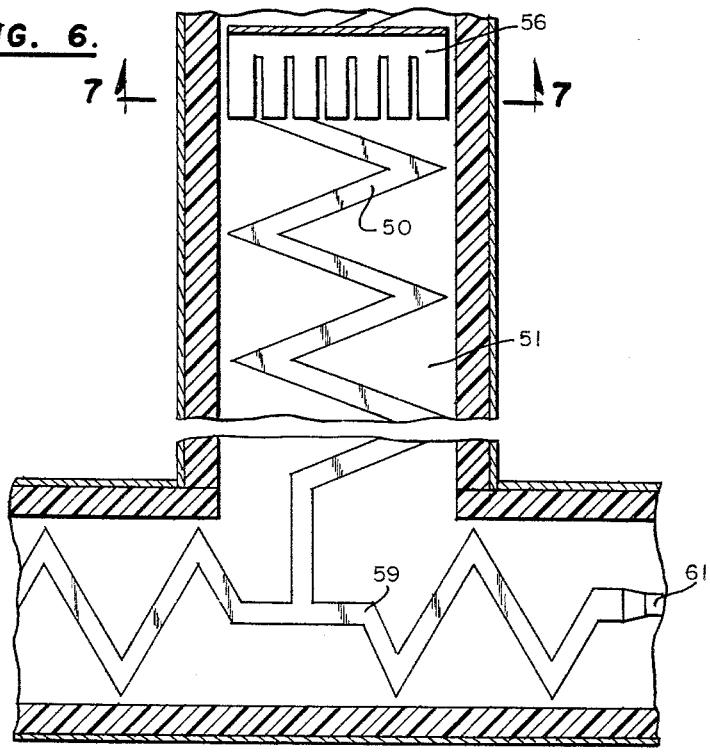
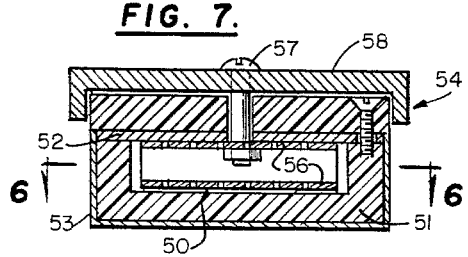
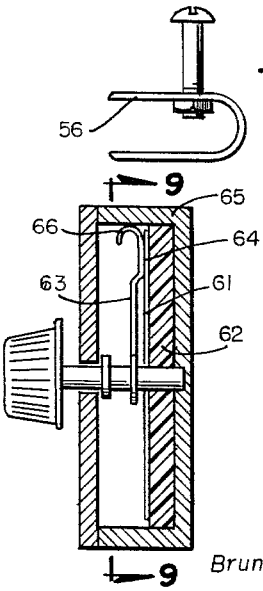
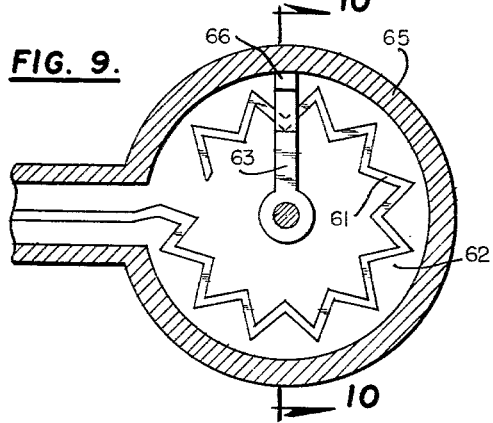

United States Patent Office 3,242,444
Patented Mar. 22, 1966

3,242,444
SLOW WAVE LINE DOUBLE-STUB TUNER
Bruno O. Weinschel, Bethesda, Md., assignor to Weinschel Engineering Co., Inc., Gaithersburg, Md., a corporation of Delaware
Filed Jan. 31, 1963, Ser. No. 255,286
11 Claims. (Cl. 333—33)

This invention relates to impedance matching and transforming devices for use in high frequency transmission systems, and more particularly relates to improvements in double-stub tuners specially adapted for use with coaxial transmission lines as variable radio-frequency impedance transformers. The invention relates to a device similar to that shown in U.S. Patent No. 2,941,169, June 14, 1960, to Bruno O. Weinschel, and has for its major object an improvement in the useful range of operation of said device.

A transmission line can be represented by series inductances and parallel capacitances (assuming an ideal lossless transmission line) where these elements are infinitely small and distributed. In the case of a coaxial transmission line having inner and outer conductors, the inner conductor has a certain inductance which can be calculated, and there is a certain shunt capacitance between the inner conductor and the outer one. In a practical coaxial device having a definite restricted length, the frequency range is limited by the physical dimensions of the device, especially the length, which limits the maximum wavelength or lower freqeuncy at which the device can be employed. It is possible to obtain a wide range of wavelengths on a physically short piece of coaxial line by making the inner conductor not a straight piece, but a coil surrounded by the straight outer conductor. The inductance of the inner conductor is thereby increased, and in order to obtain about the same impedance as before, the capacity must be made greater than before, since the impedance Z equals the square root of $L/C$. This can be done by moving the outer conductor closed to the inner conductor, and it is a major object of the present invention to take advantage of this effect in reducing the physical dimensions of a double-stub tuner. When a spiral conductor is used instead of a straight conductor for the inner member of a coaxial line, the wavelength will now not follow the straight length of the assembly, but will follow the spiral inner conductor, so that the actual wavelength of the conductor will now be much less, and will correspond to the product of the measured length and the pitch of the coil. If the inner conductor is made very thin and wound so that adjacent turns present only an edge to each other, the inter-turn capacitance can be made negligible.

In a double-stub tuner, the wavelength is limited by the maximum physical distance between the stubs as well as the maximum length of the stubs themselves. This maximum distance corresponds to one-half of the wavelength of the lowest frequency which can be used, i.e., the lowest frequency corresponds to the maximum adjustable length between stubs.

To use the tuner at a low frequency of 30 megacycles would correspond to a wavelength of 10 meters, and one-half of this length is five meters for the length of the central rod between stubs. This is physically not feasible in a device of a practical size, but this difficulty is overcome according to the invention by spiralling the inner conductor so that the length along the spiral is now five meters; from the number of turns per inch and the diameter, one can readily calculate how much shorter the new spiral conductor will be along its overall length. In practice, it is readily possible to obtain a length advantage of 7:1. With this ratio, one-half wavelength now becomes about 28.5 inches, and the overall device can be made no more than a yard in length, which is entirely feasible physically.

Instead of a spiral conductor, a slow wave line of other physical configuration may be employed, having an electrical length greater than its physical length.

The specific nature of the invention as well as other objects and advantages thereof will clearly appear from a description of a preferred embodiment as shown in the accompanying drawings, in which:

FIG. 6 is a sectional view, taken on line 6—6 of FIG. 7, of a modification utilizing a meander strip line conductor;

FIG. 7 is a view taken on line 7—7 of FIG. 6;

FIG. 8 is a side view of the spring-fingered slider of FIGS. 6 and 7;

FIG. 9 is a sectional view, taken on line 9—9 of FIG. 10, of another modification; and FIG. 10 is a view taken on line 10—10 of FIG. 9.

Figure 1:
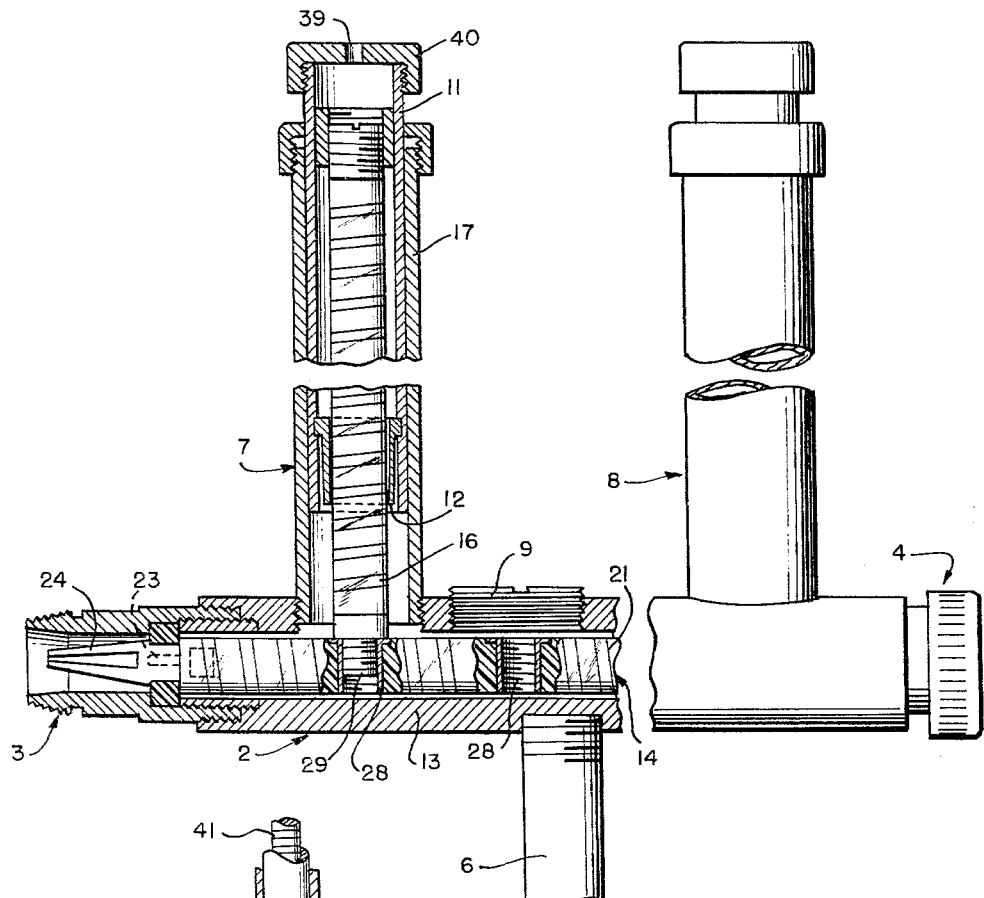
FIG. 1 is a longitudinal elevation view partly in section of a double-stub tuner in accordance with the invention.

Referring to FIG. 1, the tuner according to the invention is essentially the same type as shown in the above-mentioned Patent No. 2,941,169, and comprises a coaxial line section 2 provided at its ends with conventional coaxial male and female connectors 3 and 4 respectively and one or more supporting rods 6 which may be attached to a base (not shown) or any other suitable means of support. Stub sections 7 and 8 are screwed into any two of a number of apertures provided on the upper side of line section 2, the unused apertures being suitably filled by screw plugs such as shown at 9 to provide a smooth and unbroken interior surface, and also for protection against dirt and dust. The effective length of the tuner stubs can be manually adjusted during use by means of the telescopic sleeve 11 terminating in spring contact fingers 1w which make a sliding contact with the central conductor of the tuner as will be described below.

Central section 2 of the tuner comprises an outer grounded conductive member 13 and a central or inner conductive member 14. In the afore-mentioned prior patent, the central conductor of both the main line section and the tuner stubs is a solid conductor. As explained in the preceding discussion, the effective electrical length of such a conductor is the same as its physical length, and this seriously limits the effective frequency range of the device. The reason for this is not merely that it is impractical to make the unit five or six meters long, as would be required for ten or twelve meter work, from the point of view of size taken up by the device, but also because it is very difficult to fabricate and support such a long central conductor while maintaining the accurate spacing between the inner conductor and the outer conductor required for accurate work. It should be noted that the central conductor 16 of the stub is supported only at its ends, and must be accurately and uniformly aligned with respect to the outer stub tube 17 for the sliding contact 12 to function properly. With an excessively long element, this requirement is impossible to meet satisfactorily in practice.

In order to solve the above problem, the central elements 14 and 16 of the tuner are not made of solid conductive material as before, but instead are made of rods of insulating material. A suitable material for this purpose is an epoxy glass rod, although any other material having satisfactory mechanical and electrical properties, such as ceramic rod or tubing, may be employed.

Figure 3:
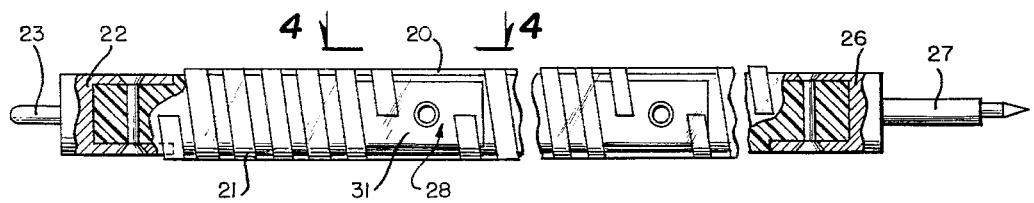
FIG. 3 is a longitudinal view partly in section of the tuner center conductor assembly.
Figure 4:
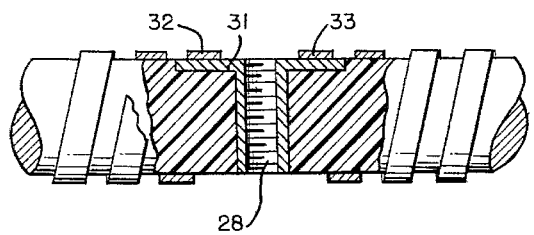
FIG. 4 is a sectional view taken on line 4—4 of FIG. 3.

As shown in FIG. 3, the center conductor assembly 14 consists of a rigid rod 20 which may be suitably of epoxy glass, having a helical conductor 21 on its outer surface. At one end of the rod there is a metal cap 22 provided with a conductive pin 23 for connection to the central conductor 24 of the female coaxial connector as shown in FIG. 1. The other end of the rod is provided with a similar cap 26, which may conveniently be fitted directly with the central conductor 27 of the male coaxial connector 4. At suitable spaced points along the rod, where the central conductors of the stubs may be inserted, metal fittings 28 are provided. These are internally threaded for reception of a corresponding threaded member 29 of the central stub conductor, as shown in FIG. 1. Each insert is also provided with a flange 31 set into the rod so that it is flush with the surface of the rod, for making electrical connection with an end of a section of the helical conductor 21, as shown at 32 and 33 (FIGS. 3 and 4). In this manner, the electrical continuity of the helical conductor is maintained, while providing a solid conductive contact with the end 29 of the stub central conductor by simply screwing the stub into the threaded member 28 at any desired location.

Figure 2:
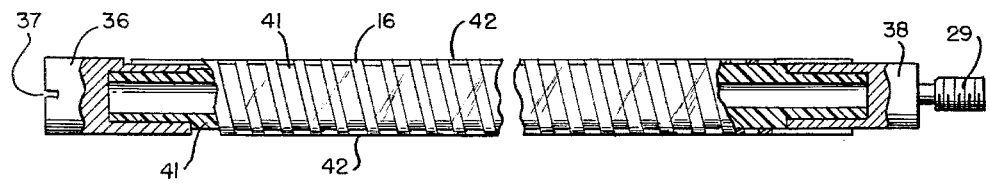
FIG. 2 is a longitudinal view partly in section of a tuner stub rod.

As shown in FIG. 2, the stub rod assembly is similarly made, except that at one end cap 36 is provided with a slot 37 for reception of a screwdriver and the other cap 38 is provided with threaded portion 29 as previously described. A screwdriver for engaging slot 37 may be inserted in aperture 39 of cap 41 as shown in FIG. 1, after which the outer conductor 17 may be similarly unscrewed from its contact with the outer conductor 13 of the central element. This permits the entire stub assembly to be removed without disassembling its respective components.

Various methods may be employed for mounting the helical conductor 16 or 21 upon its respective central rod 41 or 20. For example, a spiral groove may be cut in the surface of the rod, after which the conductive material may be deposited, as by spraying or painting, on the entire surface of the rod, and subsequently removed by machine or otherwise from all points of the surface except those previously cut in spiral form. Alternatively, a thin strip of conductive metal may be wound uniformly on the rod, being adhered thereto by any suitable adherent material such as epoxy resin. After this is done, the entire surface of the rod may be coated with more epoxy resin, which is subsequently removed to a uniform depth which leaves a smooth surface including both an exposed conductive surface and a smooth non-conductive surface between the adjacent turns of the conductive material, as shown at 42 in FIG. 2. In either case, it is important that a smooth external surface be maintained, especially in the stub assembly, because of the contact fingers 12, which would tend to strip the helical conductor from the rod if it projects appreciably above the general rod surface.

It should be noted that as compared with the central elements shown in Patent No. 2,941,169, the central elements of the present invention extend much closer to the inner surface of the outer conductive elements. As explained above, this is required in order to maintain about the same impedance, since both elements are adapted to be used with the same type and size of coaxial conductor. Due to this small clearance, it is difficult to prevent the helical conductor from touching the outer coaxial conductor, especially for the stub element 41, which requires clearance (between its end supports) for the telescopic sleeve 11. The inner conductive member 14 can be provided with fixed insulating spacers intermediate its ends, since nothing slides along it, but this cannot be done with the stub conductors, since the fingers 12 must be able to slide along the entire length of the stub.

Figure 5:
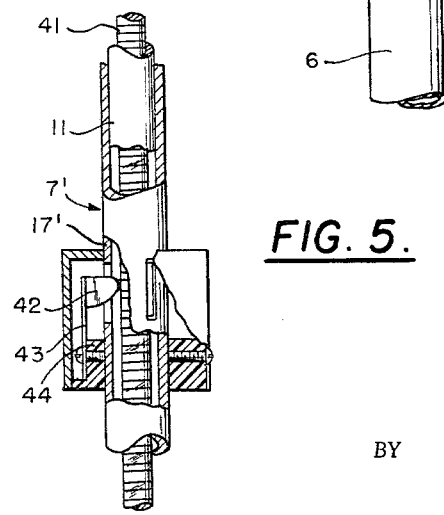
FIG. 5 shows a modification for maintaining a long stub element out of contact with the outer conductor.

FIG. 5 shows an arrangement which permits the stub element 41 to be supported intermediate its ends. Plastic retainers 42 of suitable insulating material are spring-biased toward the center of the tube 17' by spring elements 43, into centering contact with the inner conductive member 41. At least three such elements, preferably equally spaced circumferentially, are employed, and are designed so as to keep the engaged portion of member 41 centered with respect to tubular member 17'. For this purpose, the base 44 to which the spring members 43 are fastened may serve as a stop to limit the inward movement of the retainers 42. The nose of each retainer 42 is rounded, so that when sleeve 11 is moved down into engagement with the retainers, they are moved outward radially to permit the sleeve to continue its downward motion, and conversely, when the sleeve 11 is returned to an upward position, the retainers 42 move back into engagement with the center rod 41 to retain it in its spaced and centered position with respect to outer tubular member 17'. If necessary, several sets of such retainers can be used along the length of the stub, to thus support and center it at more than one point along its length.

FIGS. 6–8 show another modfification utilizing the same principle, but employing in this case a meandering strip line conductor in order to obtain a greater electrical length than the physical length of the device. In this case, the stub conductor 50 is shown as a zig-zag line acting as a microstrip line, the electrical length of which is considerably greater than the physical length between its extremities. The zig-zag line rests on an insulating member 51, preferably shaped to provide a channel member as shown, the top of which is closed off by a grounded conductive element 52, while the exterior of the entire line is preferably also shielded by conductive member 53 which is in contact with ground 52. A spring-fingered shorting slider 56 is arranged to conductively engage both the strip line 50 and the grounded surface 52, to provide a short at the point where the slider is located, similar to the action of spring fingers 12 in FIG. 1. The slider is fastened by means of a screw 57 to a cursor 58 by means of which its position along the length of the stub line can be manually adjusted. The stub line is suitably connected to the main conductive line 59, which is also a strip line of zig-zag construction suitably terminated as shown at 61 for connection to a conventional coaxial connector of any type. For ease of illustration, the connection is shown as a fixed one between the stub and the main line, but it will be apparent that a removable stub line could be employed for connection to the main line at a number of points, as in the arrangement of FIG. 1.

FIGS. 9 and 10 show still another form of the invention, also employing a strip line conductor, but in this case a rotary modification which may be used for either the stub construction or for the main line, its space-saving features being particularly useful for the stub lines. In this case, the meander line 61 is formed on insulating disc 62, and the adjustable shorting member 63 is rotatably controlled by knob 64 to provide a short between the contacted portion of the meander line at 64 and a portion of the grounded outer casing 65 which is spring-contacted at point 66.

With either of the constructions shown respectively in FIGS. 6 and 9, it is important to avoid discontinuities at the point where the line changes direction with respect to the line of movement of the shorting member; the line of contact of the shorting element with the strip line should remain electrically constant, and the meandering configuration of the line should be such as not to violate the above principle. Except for this restriction, the meander line may be widely varied to provide a convenient physical configuration. However, it is highly desirable that the short-circuiting element should change the length of the line uniformly as it is moved, and for most uses a linear variation is preferable, so that the same amount of motion of the cursor or rotor produces similar changes all along the length of the stub line.

It will be apparent that the embodiments shown are only exemplary and that various modifications can be made in construction and arrangement within the scope of my invention as defined in the appended claims.

I claim:

1. An adjustable microwave impedance matching transformer comprising a coaxial line section of a definite length having a normally grounded main outer conductor and an ungrounded main inner conductor insulatedly supported by and spaced from said outer conductor, and at least two coaxial stub tuner impedance sections attached to said line section; each of said tuner sections comprising an outer grounded stub conductor supported by and electrically connected to said main outer conductor, an ungrounded inner stub conductor electrically connected at one end only to said main inner conductor, and adjustable slider means slidably engaging the inner stub conductor for electrically connecting same to the outer conductor, at least some of said inner conductors comprising a slow wave line having its electrical length much greater than its physical length and having a negligible inter-turn capacitance, said slow wave line being in the form of a helical flat strip which is so wound that adjacent turns present only an edge to each other so as to minimize the inter-turn capacitance.

2. An adjustable microwave impedance matching transformer comprising a coaxial line section of a definite length having a normally grounded main outer conductor and a coaxial main inner conductor insulatedly supported by and spaced from said outer conductor, and at least two coaxial stub tuner impedance sections attached to said line section; each of said tuner sections comprising an outer stub conductor supported by and electrically connected to said main outer conductor, a coaxial inner stub conductor electrically connected to and supported at one end only by said main inner conductor, and adjustable slider means slidably engaging the inner stub conductor for electrically connecting same to the outer conductor, each of said inner conductors comprising an insulating rod and a helical conductor wrapped around said rod, said slider means engaging said helical conductor circumferentially of said rod so as to provide substantially the same contact with the helical conductor in all axial positions of the slider means.

3. The invention according to claim 2, the insulating rod of said main inner conductor having spaced conductive inserts therein, each said insert having a threaded aperture for receiving an end of a stub conductor, each said stub conductor having a threaded end; and a flange on said insert flush with the outer surface of said rod, said helical conductor being electrically connected to said flange.

4. The invention according to claim 2, said helical conductor being set into insulating material and having an outer surface conforming to the outer surface of the rod to provide a flush outer surface for said combined rod and helical conductor.

5. A double-stub microwave tuner for coaxial cable circuits comprising a main section of coaxial line having a center conductor element; a coaxial outer conductor element surrounding and spaced therefrom, and coaxial cable connectors on the ends of said main section; two coaxial stub tuner sections each having a center stub conductor and a coaxial outer conductor, means for removably connecting one end only of each of said stub tuner sections to said main section at any one of a number of connection points spaced along said main section; slider means on each stub section in contact with both the inner and outer conductors of the stub section for adjusting the effective length of the stub section; each center conductor element of all sections comprising a central insulating rod and a helical conductor wrapped around said rod and supported thereby, the helical conductor of each of said stub sections having an outer surface conforming to the outer surface of the supporting insulating rod and being flush with the surface of said rod to provide a smooth outer surface for engagement by said slider.

6. The invention according to claim 5, the insulating rod of said main inner conductor having spaced conductive inserts therein at said connection points, each said insert having a threaded aperture for receiving an end of a stub conductor; each stub conductor having a threaded end; and a flange on each said insert flush with the outer surface of the rod, the helical conductor on said rod being electrically connected to said flange.

7. An adjustable microwave impedance matching transformer comprising a coaxial line section of a definite length having a normally grounded main outer conductor and an ungrounded main inner conductor insulatedly supported by and spaced from said outer conductor, and at least two coaxial stub tuner impedance sections attached to said line section; each of said tuner sections comprising an outer grounded stub conductor supported by and electrically connected to said main outer conductor, an ungrounded inner stub conductor electrically connected at one end to said main inner conductor, and adjustable slider means slidably engaging the inner stub conductor for electrically connecting same to the outer conductor, each of said inner conductors comprising a slow wave line in the form of a microstrip line having a zig-zag configuration, whereby its electrical length is much greater than its physical length.

8. The invention according to claim 7, said zig-zag line being in the form of a series of V-shaped elements joined at their tips.

9. The invention according to claim 8, said V-shaped elements lying in a straight line, and cursor means connected to said adjustable slider means to move same along said straight line.

10. The invention according to claim 8, said V-shaped elements being connected along the arc of a circle to form a generally circularly zig-zag line, a rotatable shaft supported axially at the center of said circle, said slider means being fixed to said shaft for rotation thereby along said circular zig-zag line.

11. An adjustable microwave impedance matching transformer comprising a coaxial line section of a definite length having a normally grounded main outer conductor and an ungrounded main inner conductor insulatedly supported by and spaced from said outer conductor, and at least two coaxial stub tuner impedance sections attached to said line section; each of said tuner sections comprising an outer grounded stub conductor supported by and electrically connected to said main outer conductor, an ungrounded inner stub conductor electrically connected at one end only to said main inner conductor, and adjustable slider means slidably engaging the inner stub conductor for electrically connecting same to the outer conductor, at least some of said inner conductors comprising a slow wave line having its electrical length much greater than its physical length, and having a negligible inter-turn capacitance, said slow wave line being a meandering strip line.

References Cited by the Examiner

UNITED STATES PATENTS

| | | | |
|---|---|---|---|
| 2,513,761 | 7/1950 | Tyson | 333—73 |
| 2,790,959 | 4/1957 | Small | 333—73 |
| 2,941,169 | 6/1960 | Weinschel | 333—33 |
| 2,943,276 | 6/1960 | Lovick | 333—29 |
| 2,984,798 | 5/1961 | Bryan | 333—73 |

FOREIGN PATENTS 659,863   10/1951   Great Britain.

HERMAN KARL SAALBACH, *Primary Examiner.*

ELI LIEBERMAN, *Examiner.*